US010761883B2

(12) United States Patent
Takeuchi et al.

(10) Patent No.: US 10,761,883 B2
(45) Date of Patent: Sep. 1, 2020

(54) PROGRAM EXECUTING APPARATUS AND PROGRAM EXECUTION METHOD

(71) Applicant: HITACHI, LTD., Tokyo (JP)

(72) Inventors: Tadashi Takeuchi, Tokyo (JP); Takaaki Haruna, Tokyo (JP)

(73) Assignee: HITACHI LTD., Tokyo (JP)

( * ) Notice: Subject to any disclaimer, the term of this patent is extended or adjusted under 35 U.S.C. 154(b) by 304 days.

(21) Appl. No.: 15/927,355

(22) Filed: Mar. 21, 2018

(65) Prior Publication Data
US 2019/0102219 A1    Apr. 4, 2019

(30) Foreign Application Priority Data
Oct. 4, 2017    (JP) .................. 2017-194511

(51) Int. Cl.
*G06F 9/46*    (2006.01)
*G06F 9/48*    (2006.01)
*G06F 9/54*    (2006.01)

(52) U.S. Cl.
CPC ............ *G06F 9/4856* (2013.01); *G06F 9/542* (2013.01); *G06F 9/544* (2013.01); *G06F 9/461* (2013.01); *G06F 9/4862* (2013.01)

(58) Field of Classification Search
CPC ........ G06F 9/4856; G06F 9/542; G06F 9/544; G06F 9/461; G06F 9/4862
See application file for complete search history.

(56) References Cited

U.S. PATENT DOCUMENTS

| | | | |
|---|---|---|---|
| 2012/0278804 A1* | 11/2012 | Narayanasamy | ... G06F 9/45558 718/1 |
| 2013/0212212 A1 | 8/2013 | Addepalli et al. | |
| 2013/0326177 A1* | 12/2013 | Oiwa | .................... G06F 3/0647 711/162 |
| 2014/0137125 A1 | 5/2014 | Hsu | |

* cited by examiner

*Primary Examiner* — Emerson C Puente
*Assistant Examiner* — Jonathan R Labud
(74) *Attorney, Agent, or Firm* — Volpe and Koenig, P.C.

(57) ABSTRACT

According to one embodiment, a program executing apparatus includes an event management portion to configure migration timing of the program on the basis of a state of the program being executed at reception of a migration request from the program, and a state transmission portion to migrate state information of the program on the basis of the migration timing configured in the event management portion.

13 Claims, 20 Drawing Sheets

FIG. 3

File location data ~135

| Global file name | File server IP address | Local file name |
|---|---|---|
|  |  |  |
|  |  |  |
|  |  |  |

| Socket ID | Local IP address | Local port number | Remote IP address | Remote port number | Transmission sequence number | Reception sequence number |
|---|---|---|---|---|---|---|
|  |  |  |  |  |  |  |
|  |  |  |  |  |  |  |
|  |  |  |  |  |  |  |

| Socket ID | ack completed number |
|---|---|
|  |  |
|  |  |
|  |  |

1512
1701  1702

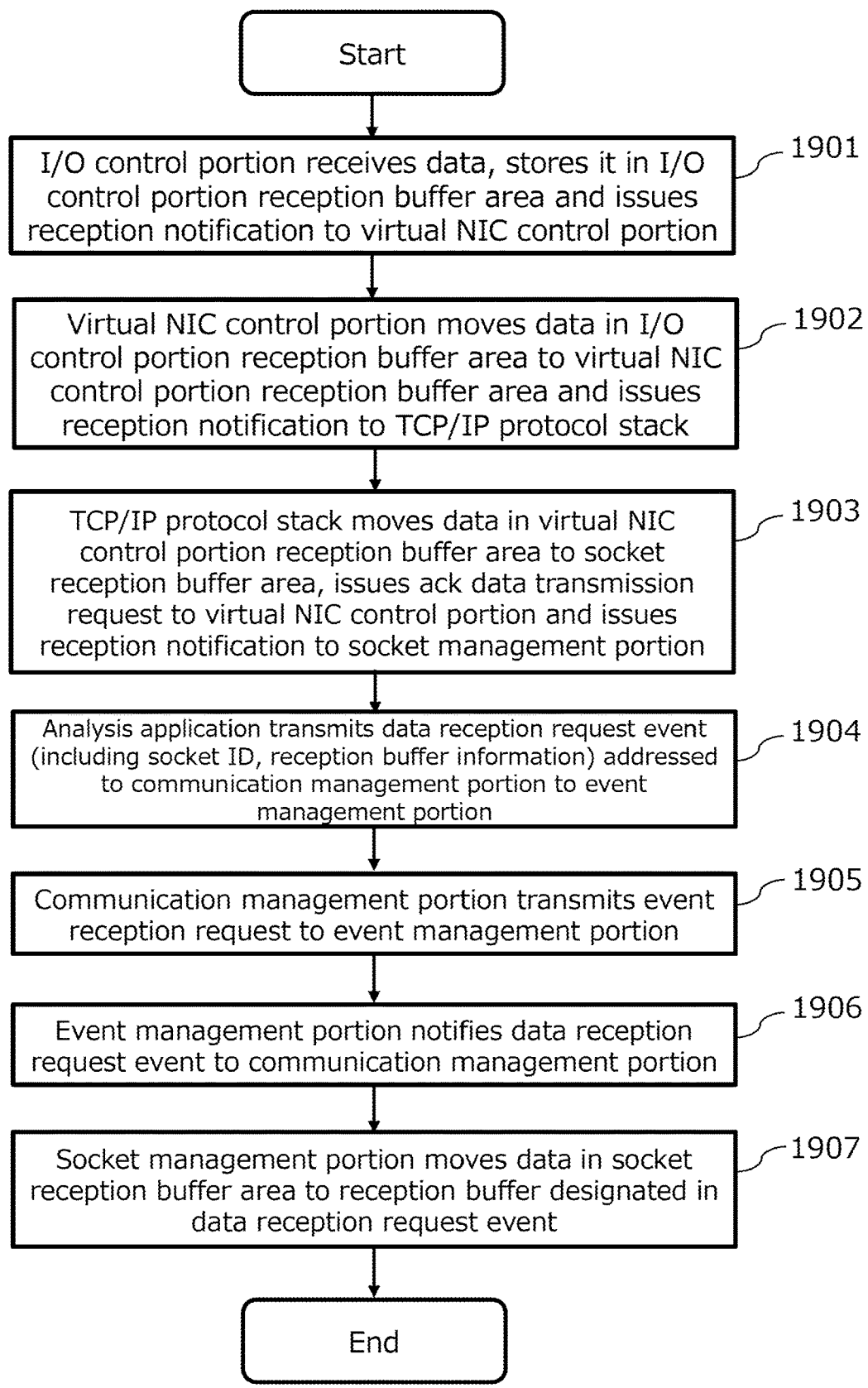

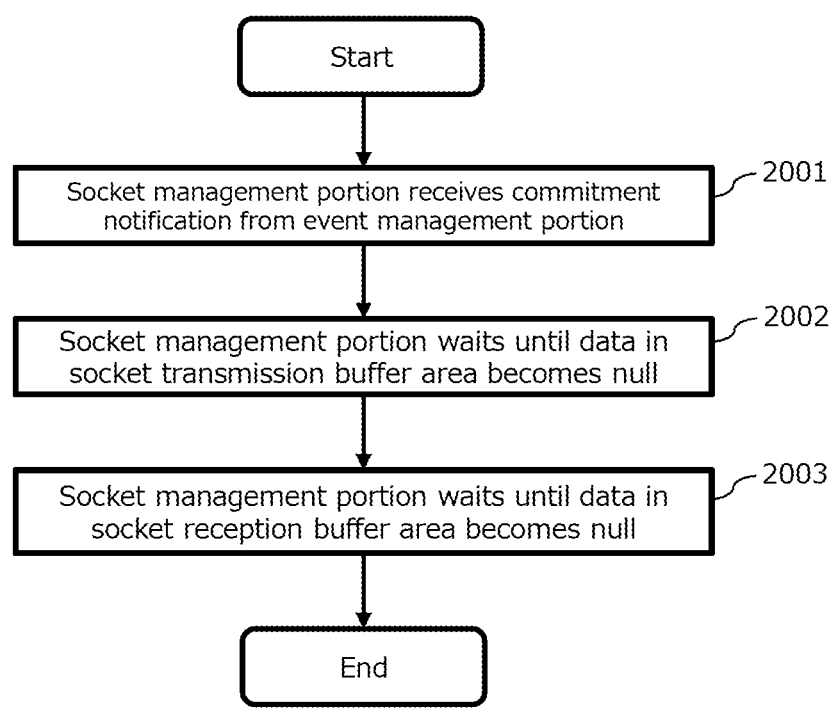

PROGRAM EXECUTING APPARATUS AND
PROGRAM EXECUTION METHOD

CROSS-REFERENCE TO RELATED
APPLICATIONS

This application is based upon and claims the benefit of priority from Japanese Patent Application No. 2017-194511, filed on Oct. 4, 2017; the entire contents of all of which are incorporated herein by reference.

FIELD

The present invention relates to a program executing apparatus and a program execution method, capable of executing processing of data disposed in a distributed manner.

BACKGROUND

As apparatuses and methods for executing computing processing of data disposed in a wide area in a distributed manner at a high speed, technologies described in Cisco, "Application Context Transfer for Distributed Computing Resources", Patent US2013/0212212, August 2013 (Patent Literature 1) and Hsu, "Application Migration with Dynamic Operating System Containers", Patent US 2014/0137125 A1, May, 2014 (Patent Literature 2) are known.

In the technology described in Patent Literature 1, a technology of migrating an application to a device remotely separated from a specific device and of continuing execution of the application is provided.

The technology described in Patent Literature 2 enables transfer of not only state information of the application currently being executed but also the state information of an operating system (hereinafter referred to as OS) currently being executed to a remote server.

SUMMARY

However, with the method of transferring only the state information of the application currently being executed at migration of the application, the state of the OS function such as network communication protocol stack currently being executed is not transferred. Thus, it cannot be applied to an application executing computing processing while the OS function such as network communication is used.

Moreover, if the application and the OS are executed while all the states including a work state currently being executed by the application and the OS are transferred, network transfer of a large quantity of data can occur, which might incur execution delay.

The present invention was made in view of the aforementioned circumstances and has an object to provide a program executing apparatus and a program execution method, capable of executing computing processing of data disposed in a distributed manner at a high speed while a load on the network is suppressed.

In order to achieve the aforementioned object, a program executing apparatus according to a first aspect includes an event management portion to configure migration timing of the program on the basis of a state of the program being executed at reception of a migration request from the program, and a state transmission portion to migrate state information of the program on the basis of the migration timing configured in the event management portion.

According to the first aspect of the program executing apparatus, the computing processing of the data disposed in the distributed manner can be executed at a high speed while a load on a network is suppressed.

BRIEF DESCRIPTION OF THE DRAWINGS

FIG. 3 is a view illustrating a data structure of file location data according to the embodiment.

FIG. 16 is a view illustrating a data structure of TCP/IP session state information according to the embodiment.

FIG. 17 is a view illustrating a data structure of TCP/IP ack state information according to the embodiment.

FIG. 19 is a flowchart illustrating processing of the communication management portion at reception of a data reception request event according to the embodiment.

FIG. 20 is a flowchart illustrating processing of the communication management portion at reception of a commitment notification according to the embodiment.

DETAILED DESCRIPTION OF THE
EMBODIMENT

An embodiment will be described by referring to the attached drawings. The embodiment described below is not intended to limit the invention according to claims, and all the elements described in the embodiment and their combinations are not necessarily indispensable for a solution part of the invention.

Figure 1:
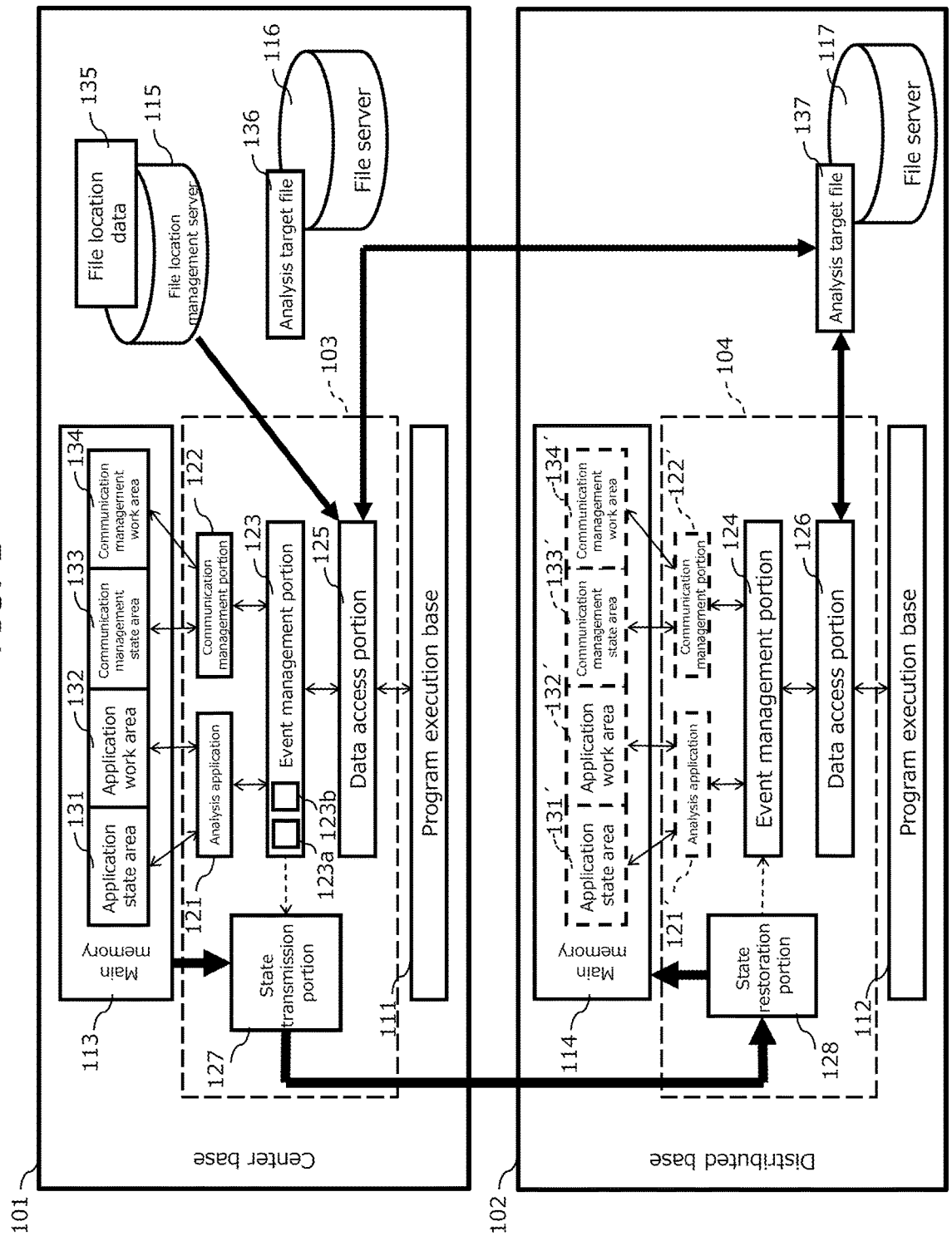
FIG. 1 is a block diagram illustrating system configuration of a program execution system according to an embodiment.

FIG. 1 is a block diagram illustrating configuration of a program execution system according to the embodiment. In the description below, a case where a center base 101 is a migration source of a program, while a distributed base 102 is a migration destination of the program is used as an example.

In FIG. 1, in the program execution system, the center base 101 and the distributed base 102 are provided. The center base 101 and the distributed base 102 are coupled via a communication network. This communication network may be a wide-range communication network such as the Internet or may be LAN (Local Area Network), or they may be mixed. In the center base 101 and the distributed base 102, data processed by the program can be disposed in a distributed manner. At this time, big data disposed in the distributed manner in the center base 101 and the distributed base 102 can be analyzed while the program is migrated between the center base 101 and the distributed base 102.

Moreover, in the center base 101, a file location management server 115 and a file server 116 are provided. In the distributed base 102, a file server 117 is provided. File location data 135 is stored in the file location management server 115. The file location data 135 manages which of analysis target files 136 and 137 is stored in which of the file servers 116 and 117. The analysis target files 136 and 137 are stored in the file servers 116 and 117, respectively.

Moreover, in the center base 101 and the distributed base 102, program execution bases 111 and 112 and main memories 113 and 114 are provided, respectively. The program execution bases 111 and 112 can realize program executing apparatuses 103 and 104 in the center base 101 and the distributed base 102 by executing the program stored in the main memories 113 and 114, respectively.

The program executing apparatuses 103 and 104 execute processing of data disposed in the center base 101 and the distributed base 102 in the distributed manner, while migrating the program between the center base 101 and the distributed base 102. Here, when the program is to be migrated from the center base 101 to the distributed base 102, the program is executed in the center base 101 up to a step at which a work area used in the program can be initialized, and migration timing can be configured so that the execution of the program is handed over in the distributed base 102 at the subsequent step.

The area used by the program executed by the program executing apparatuses 103 and 104 can be managed by being divided into a work area and a state area. The program can include an application and an OS. At this time, the area used by the program can be managed by being divided into the work area and the state area for the application and the OS, respectively. After the program is executed in the center base 101 up to a step at which the work area can be initialized, the program is migrated to the distributed base 102. By doing this, transmission of work information from the center base 101 to the distributed base 102 can be made unnecessary.

In the program executing apparatuses 103 and 104, analysis applications 121 and 121', communication management portions 122 and 122', event management portions 123 and 125, and data access portions 124 and 126 are provided. Moreover, in the program executing apparatus 103, a state transmission portion 127 is provided, while in the program executing apparatus 104, a state restoration portion 128 is provided.

The analysis applications 121 and 121' execute applications for analysis. The analysis mentioned here can include a series of processing for working on the data. At this time, the analysis applications 121 and 121' can Get/Put the analysis target files 136 and 137. The communication management portion 122 and 122' execute data transmission processing on the basis of data transmission requests from the analysis applications 121 and 121' or execute data reception processing on the basis of data reception requests from the analysis applications 121 and 121'. The communication management portions 122 and 122' can be incorporated in the OS used by the analysis applications 121 and 121'.

The event management portions 123 and 125 configure the migration timing of the analysis applications 121 and 121' and the communication management portions 122 and 122' on the basis of states of execution of the analysis applications 121 and 121' and the communication management portions 122 and 122' at reception of migration requests from the analysis applications 121 and 121'. The data access portions 124 and 126 detect IP addresses of the file servers 116 and 117 holding data processed by the analysis applications 121 and 121' on the basis of the requests from the analysis applications 121 and 121'. The state transmission portion 127 migrates state information of an application state area 131 and a communication management state area 133 on the basis of the migration timing configured in the event management portion 123. The state restoration portion 128 restores the states of the analysis application 121 and the communication management portion 122 in the center base 101 on the distributed base 102 on the basis of the state information of the application state area 131 and the communication management state area 133 migrated from the state transmission portion 127 and takes over the execution of the analysis application 121 and the communication management portion 122.

In the event management portion 123, a memory area reservation portion 123a and a migration standby portion 123b are provided. The memory area reservation portion 123a reserves the application state area 131, the application work area 132, the communication management state area 133, and the communication management work area 134 in the main memory 113. The migration standby portion 123b causes migration of the analysis application 121 and the communication management portion 122 to stand by until event processing currently being executed by the analysis application 121 and the communication management portion 122 is completed. Note that the event mentioned here is an execution unit of the program executing processing in accordance with a user input or a request from the OS. At this time, programming can be executed by the unit of events. Moreover, the work areas used in execution of the program can be initialized for each event.

Here, the event management portion 123 can provide an API (Application Programming Interface) for reserving the application state area 131, the application work area 132, the communication management state area 133, and the communication management work area 134 for the analysis application 121 and the communication management portion 122. Moreover, the event management portion 123 can provide the API by which the analysis application 121 designates a migration destination and the API by which the analysis application 121 declares completion of migration preparation.

In the main memories 113 and 114, the application state areas 131 and 131', the application work areas 132 and 132', the communication management state areas 133 and 133', and the communication management work areas 134 and 134' are stored, respectively. The application state areas 131 and 131' and the application work areas 132 and 132' are used by the analysis applications 121 and 121', respectively. The communication management state areas 133 and 133' and the communication management work areas 134 and 134' are used by the communication management portions 122 and 122', respectively.

In the application state areas 131 and 131', the state information being executed by the analysis applications 121 and 121' is stored, respectively. In the application work areas 132 and 132', the work information being executed by the analysis applications 121 and 121' is stored, respectively. In the communication management state areas 133 and 133', the state information relating to the event processing being executed by the communication management portions 122 and 122' is stored, respectively. In the communication management work areas 134 and 134', the work information relating to the event processing being executed by the communication management portions 122 and 122' is stored, respectively.

Then, when the analysis application 121 or the communication management portion 122 calls API reserving the application state area 131, the application work area 132, the communication management state area 133, and the communication management work area 134, the event management portion 123 updates a table managing address information of the application state area 131, the application work area 132, the communication management state area 133, and the communication management work area 134 and reserves the application state area 131, the application work area 132, the communication management state area 133, and the communication management work area 134 on the main memory 113.

Moreover, when the analysis application 121 calls the API designating a migration destination, the event management portion 123 stands by until the analysis application 121 completes referring/update processing of data in the application work area 132 and calls the API declaring completion of migration preparation.

Moreover, when the analysis application 121 calls the API declaring completion of migration preparation, the event management portion 123 issues a commitment notification to the communication management portion 122 and waits for completion of the referring/update processing of the data in the communication management work area 134 by the communication management portion 122. After that, the event management portion 123 issues a migration instruction of the analysis application 121 and the communication management portion 122 to the state transmission portion 127.

The state transmission portion 127 having received the migration instruction transmits the state information of the application state area 131 and the communication management state area 133 and the address information of the application state area 131, the application work area 132, the communication management state area 133, and the communication management work area 134 to the state restoration portion 128.

The state restoration portion 128 copies the state information of the application state area 131 and the communication management state area 133 received from the state transmission portion 127 onto the main memory 114 and restores the states of the application state area 131 and the communication management state area 133 on the distributed base 102. At this time, the application state area 131' and the communication management state area 133' storing the state information of the application state area 131 and the communication management state area 133 can be reserved on the main memory 114.

Moreover, the state restoration portion 128 reserves the application work area 132' and the communication management work area 134' on the main memory 114 on the basis of the address information of the application work area 132 and the communication management work area 134 received from the state transmission portion 127. Then, the application work area 132' and the communication management work area 134' are initialized, and the analysis application 121' and the communication management portion 122' are executed in the distributed base 102, which is a migration destination of the analysis application 121 and the communication management portion 122.

Here, by causing the migration of the analysis application 121 and the communication management portion 122 to stand by until the completion of the event processing currently being executed by the analysis application 121 and the communication management portion 122, the execution of the analysis application 121 and the communication management portion 122 can be handed over at the migration destination without transmitting the work information of the application work area 132 and the communication management work area 134 to the migration destinations of the analysis application 121 and the communication management portion 122. At this time, not only the state information of the analysis application 121 but also the state information of the communication management portion 122 can be transmitted to the migration destination. Thus, it can be applied to an application executing computing processing by using the OS function such as network communication, while an increase in a load on the network transfer is suppressed.

It is to be noted that the analysis applications 121 and 121' can execute Get/Put operations of the analysis target files 136 and 137 through the data access portions 123 and 124, respectively. Then, the data access portions 123 and 124 can detect the IP address of the migration destination on the basis of a file Get request or a file Put request from the analysis applications 121 and 121'.

At this time, by designation of the migration destinations by the analysis applications 121 and 121', storage destinations of the analysis target files 136 and 137 to be used at the migration destinations of the analysis applications 121 and 121' can be detected with accuracy, and the migration destinations of the analysis applications 121 and 121' can be found efficiently.

In the aforementioned embodiment, the state information relating to the communication management is used as an example of the state information of the OS, but the state information of the OS may be other than the state information relating to the communication management.

Figure 2:
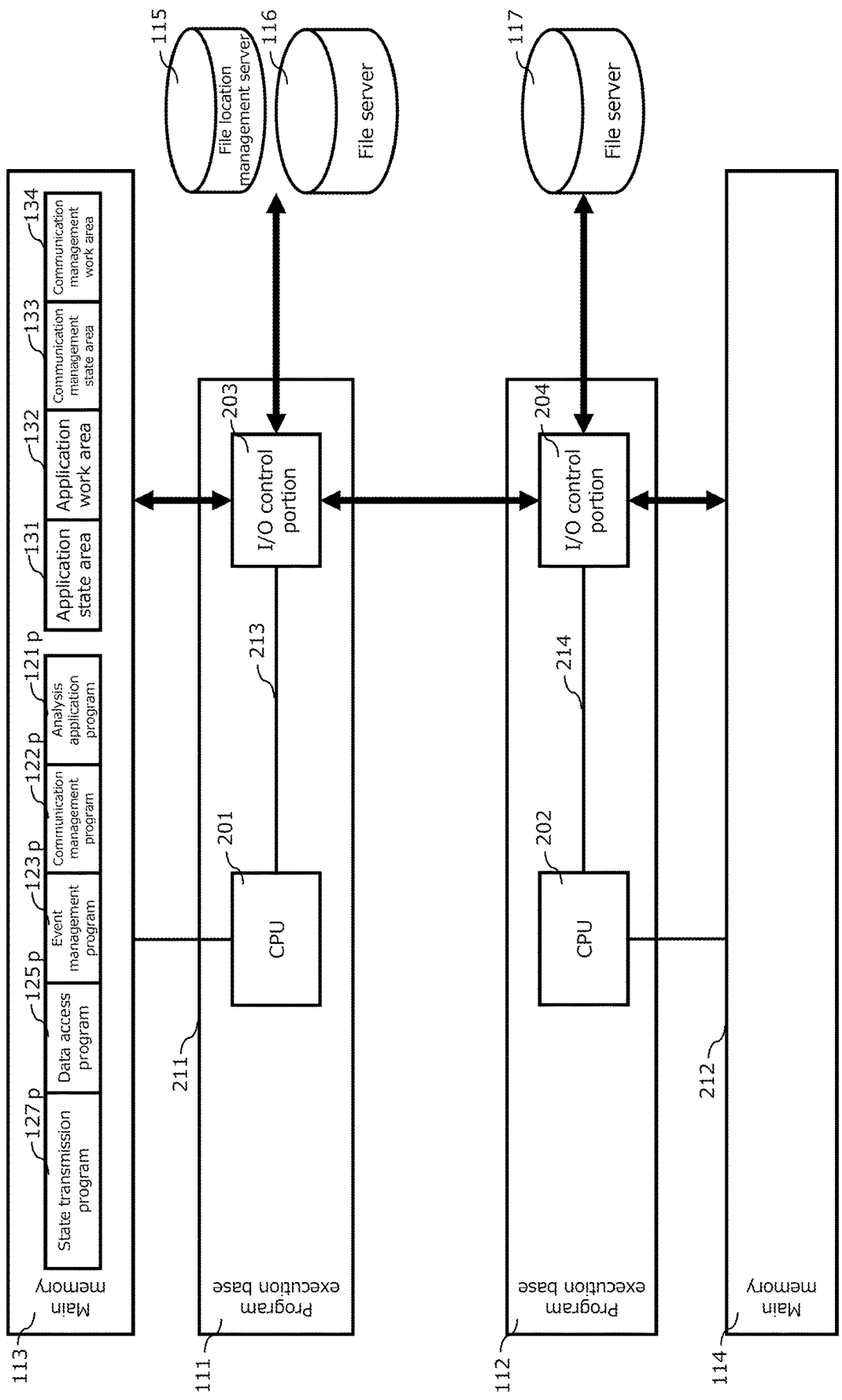
FIG. 2 is a block diagram illustrating hardware configuration of the program execution system according to the embodiment.

FIG. 2 is a block diagram illustrating hardware configuration of the program execution system according to the embodiment.

In FIG. 2, in the program execution bases 111 and 112, CPU 201 and 202 and I/O control portions 203 and 204 are provided, respectively. The CPU 201 and 202 are coupled to the main memories 113 and 114 through memory buses 211 and 212, respectively.

In the main memory 113, a state transmission program 127$p$, a data access program 125$p$, an event management program 123$p$, a communication management program 122p, and an analysis application program 121p are stored. Then when the CPU 201 executes the state transmission program 127p, the data access program 125p, the event management program 123p, the communication management program 122p, and the analysis application program 121p, the state transmission portion 127, the data access portion 125, the event management portion 123, the communication management portion 122, and the analysis application 121 can be realized on the center base 101.

Moreover, the CPU 201 executes referring/update processing of the application state area 131, the application work area 132, the communication management state area 133, and the communication management work area 134 on the main memory 113 in accordance with an instruction of the program.

Furthermore, the CPU 201 and 202 are coupled to the I/O control portions 203 and 204 through the I/O buses 213 and 214, respectively. Then, the CPU 201 and 202 execute I/O processing with respect to the file location server 115 and the file servers 116 and 117 in accordance with the instruction of the program. Moreover, the CPU 201 and 202 conduct data transmission to the I/O control portions 203 and 204 of the remote program execution bases 111 and 112 and can also write the data in the main memories 113 and 114 coupled to the remote program execution bases 111 and 112.

FIG. 3 is a view illustrating a data structure of the file location data according to the embodiment. In FIG. 3, in the file location data 135, an entry can be provided for each of the analysis target files 136 and 137.

In the file location data 135, a field for storing a global file name 301, a field for storing a file server IP address 302, and a field for storing a local file name 303 can be provided.

The global file name 301 can be used to uniquely identify the analysis target files 136 and 137 present on all the bases and for the analysis application 121 to designate the analysis target files 136 and 137. The file server IP address 302 can specify the file servers 116 and 117 storing the analysis target files 136 and 137. The local file name 303 can be used in file management in the file servers 116 and 117.

Figure 4:
FIG. 4 is a flowchart illustrating a processing of a data access portion according to the embodiment.

FIG. 4 is a flowchart illustrating processing of the data access portion according to the embodiment.

In FIG. 4, the data access portion 123 starts an operation by using reception of a Get request or a Put request from the event management portions 123 and 124 as a trigger (Step 401). The global file names 301 designating the analysis target files 136 and 137 which become access targets and information indicating a type on necessity of execution are both given to the Get request or the Put request.

Subsequently, the data access portion 123 acquires the file location data 135 from the file location management server 115 (Step 402). At this time, an entry matching the global file name 301 designated at Step 401 is searched, and the file server IP address 302 and the local file name 303 corresponding to the entry are acquired.

Subsequently, the data access portion 123 inspects the type of execution necessity given at Step 401 (Step 403). If execution is necessary, an I/O is issued to the file servers 116 and 117 designated by the file server IP address 302 acquired at Step 402, and a Get operation or a Put operation of the file designated by the local file name 303 is performed (Step 404).

Subsequently, the data access portion 123 transmits an execution result of the Get operation or the Put operation at Step 404 to the event management portion 123 (Step 405) and ends the processing.

On the other hand, if it is determined at Step 403 that execution is not necessary, the information on the file server IP address 302 and the local file name 303 acquired at Step 402 is notified to the event management portion 123 (Step 406). At this time, the data access portion 123 ends the processing without executing the actual Get operation or Put operation to the file servers 116 and 117.

Figure 5:
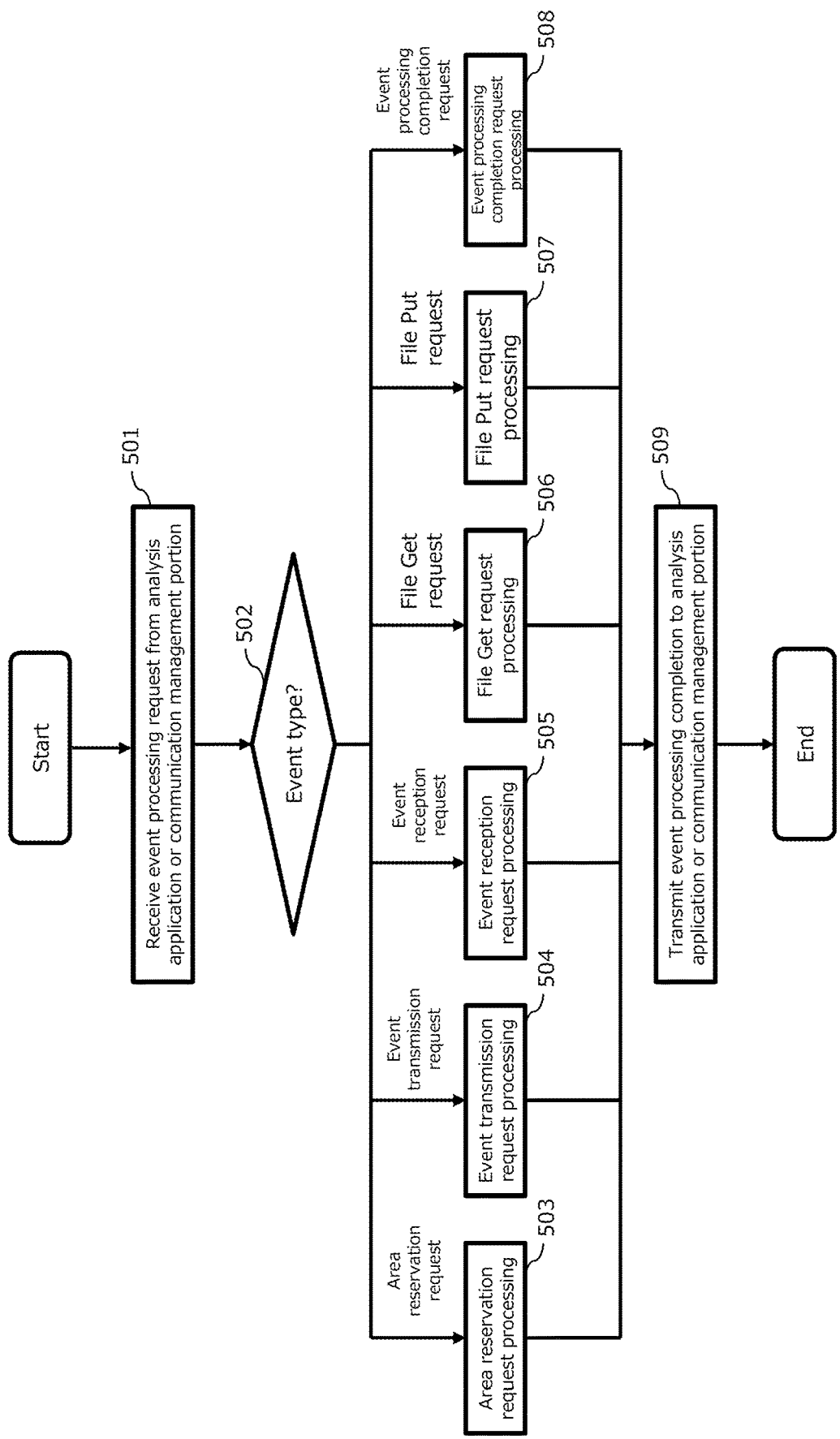
FIG. 5 is a flowchart illustrating an overall processing of an event management portion according to the embodiment.

FIG. 5 is a flowchart illustrating entire processing of the event management portion according to the embodiment.

In FIG. 5, the event management portion 123 starts an operation by using reception of an event processing request from the analysis application 121 or the communication management portion 122 as a trigger (Step 501).

Subsequently, the event management portion 123 determines the type of an event requested at Step 501 (Step 502).

The types of events include an area reservation request, an event transmission request, an event reception request, a file Get request, a file Put request, and an event processing completion request. When any one of these event processing requests is received, the event management portion 123 executes the respective request processing (Step 503 to Step 508). Details of each request processing will be described later.

Subsequently, the event management portion 123 notifies completion of the event processing to the analysis application 121 or the communication management portion 122 (Step 509) and completes the processing.

Figure 6:
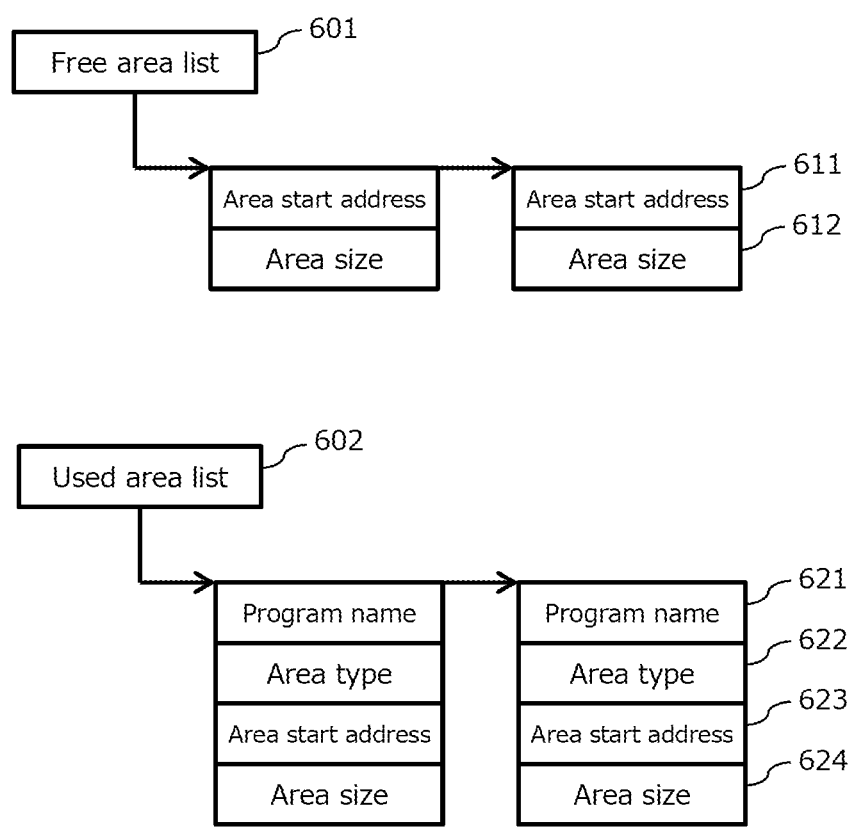
FIG. 6 is a view illustrating a data structure used in area reservation request processing of the event management portion according to the embodiment.

FIG. 6 is a view illustrating a data structure used for the area reservation request processing by the event management portion according to the embodiment.

In FIG. 6, the event management portion 123 manages the area of the main memory 113 by using the data structures of a free area list 601 and a used area list 602 and holds the data managed by the free area list 601 and the used area list 602 on the main memory 113. In the free area list 601, information in an unused memory area is stored, while in the used area list 602, information on the memory area in use is stored.

The free area list 601 manages information on an area start address 611 and an area size 612 of the respective unused memory areas by list structures.

The used area list 602 manages information on a program name 621 in use, an area type 622 for identifying whether an area allocated to the main memory 113 is a state area or a work area, an area start address 623, and an area size 624 for the respective memory areas in use by list structures.

Figure 7:
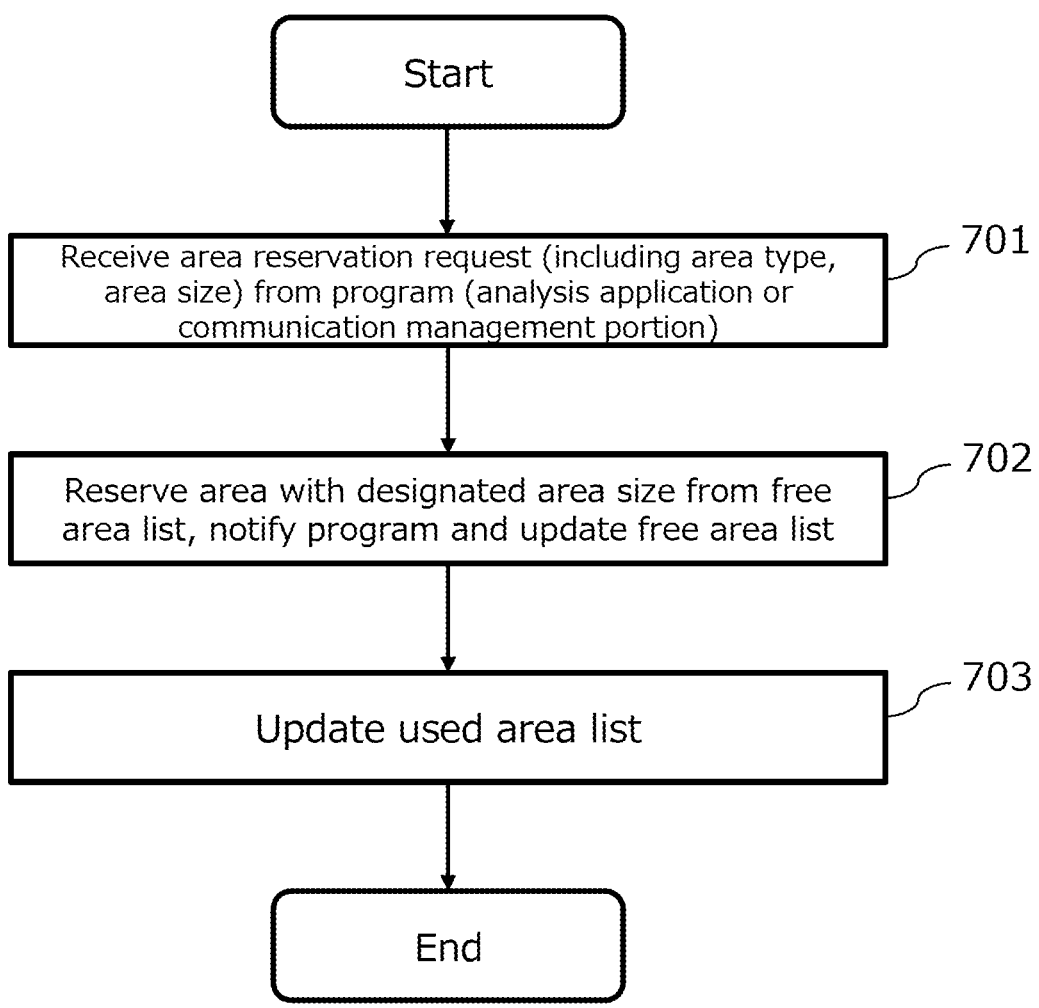
FIG. 7 is a flowchart illustrating the area reservation request processing of the event management portion according to the embodiment.

FIG. 7 is a flowchart illustrating area reservation request processing of the event management portion according to the embodiment.

In FIG. 7, the event management portion 123 receives an area reservation request from the analysis application 121 or the communication management portion 122 (Step 701). The area reservation request includes information on the area type 622 for identifying whether the area to be reserved in the main memory 113 is a state area or a work area and the area size 624.

Subsequently, the event management portion 123 searches the free area list 601 and acquires an unused memory area having a designated area size or more (Step 702). Then, the event management portion 123 updates the free area list 601 and deletes the acquired memory area from the free area list 601. Moreover, it notifies the area start address 623 of the reserved memory area to the analysis application 121 or the communication management portion 122.

Subsequently, the event management portion 123 updates the used area list 602 and manages the memory area reserved at Step 702 as a used memory area (Step 703).

Figure 8:
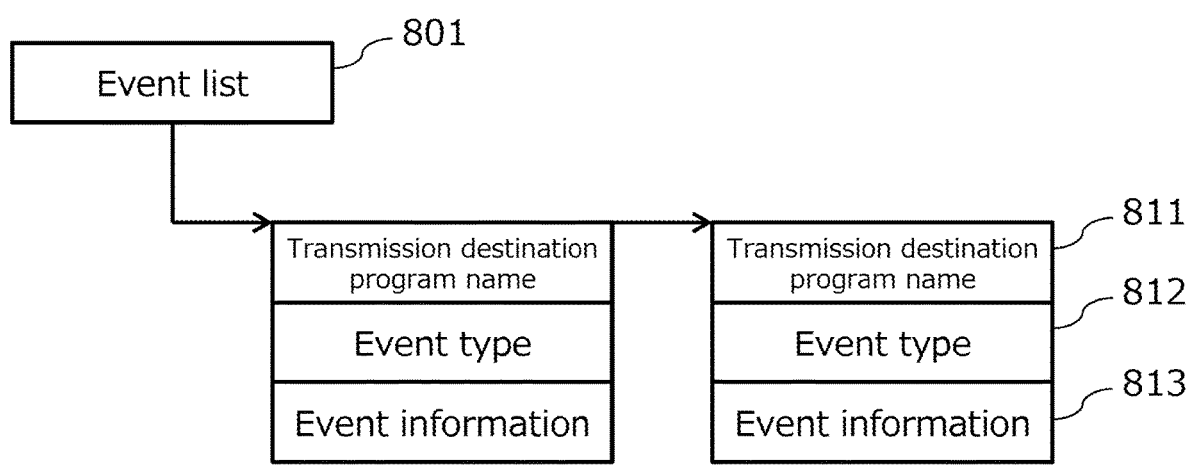
FIG. 8 is a view illustrating a data structure of an event list used for event transmission request processing and event reception request processing of the event management portion according to the embodiment.

FIG. 8 is a view illustrating a data structure of an event list used for the event transmission request processing and the event reception request processing of the event management portion according to the embodiment.

In FIG. 8, though the event transmission request was issued from the analysis application 121 or the communication management portion 122, the event reception request has not been issued from the analysis application 121 or the communication management portion 122 and thus, the event management portion 123 manages a list of events remaining in the event management portion 123 by using a data structure of an event list 801. At this time, the data structure of the event list 801 is held on the main memory 113.

To the event list 801, entries storing a transmission destination program name 811 which issued the event transmission request, an event type 812 transmitted in the event transmission request, and event information 813 transmitted together in the event transmission request are coupled in a list state.

Figure 9:
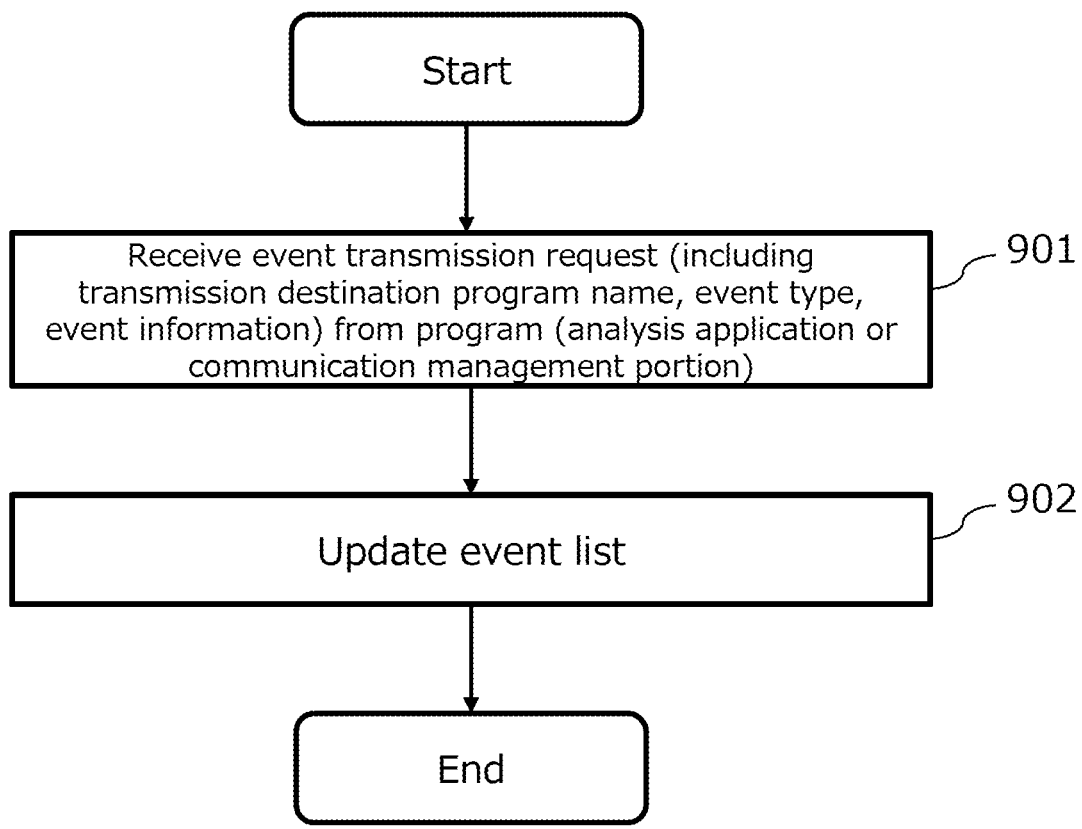
FIG. 9 is a flowchart illustrating the event transmission request processing of the event management portion according to the embodiment.

FIG. 9 is a flowchart illustrating the event transmission request processing of the event management portion according to the embodiment.

In FIG. 9, the event management portion 123 receives the event transmission request from the analysis application 121 or the communication management portion 122 (Step 901). The event transmission request includes the transmission destination program name 811, the event type 812, and the event information 813 transmitted by accompanying the event.

Subsequently, the event management portion 123 generates entries storing the transmission destination program name 811, the event type 812, and the event information 813. Then, by coupling the entries to the event list 801, the event management portion 123 updates the event list 801 (Step 902) and completes the processing.

Figure 10:
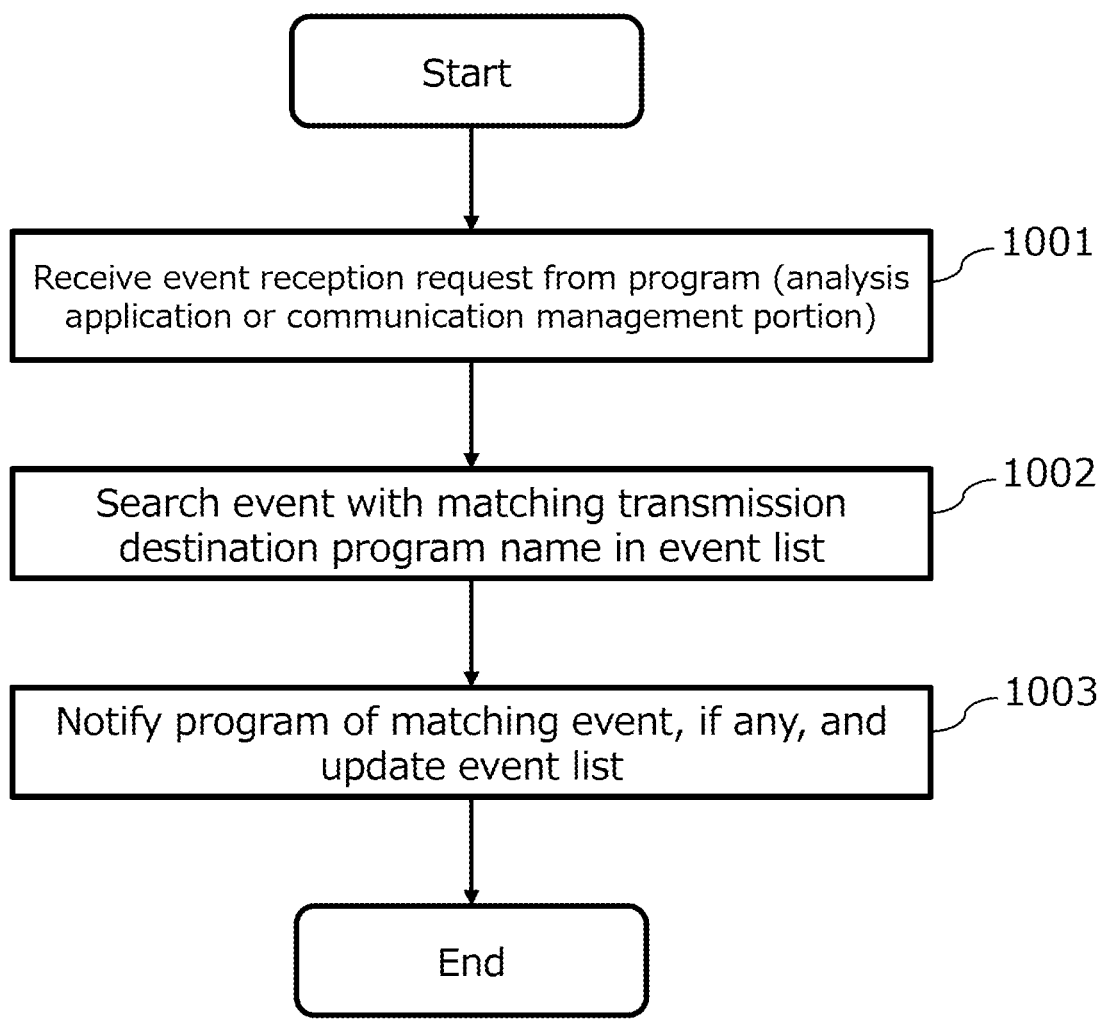
FIG. 10 is a flowchart illustrating the event reception request processing of the event management portion according to the embodiment.

FIG. 10 is a flowchart illustrating event reception request processing of the event management portion according to the embodiment.

In FIG. 10, the event management portion 123 receives the event transmission request from the analysis application 121 or the communication management portion 122 (Step 1001).

Subsequently, the event management portion 123 searches the event list 801. Then, the event management portion 123 searches an entry which stores the program which issued the event reception request at Step 1001 in the transmission destination program name 811 (Step 1002).

Subsequently, if there is an entry with the matching transmission destination program name 811, the event management portion 123 notifies the event type 812 and the event information 813 stored in the entry to the program which issued the event reception request at Step 1001. Moreover, the event management portion 123 updates the event list 801 by deleting the entry from the event list 801 (Step 1003) and completes the processing.

Figure 11:
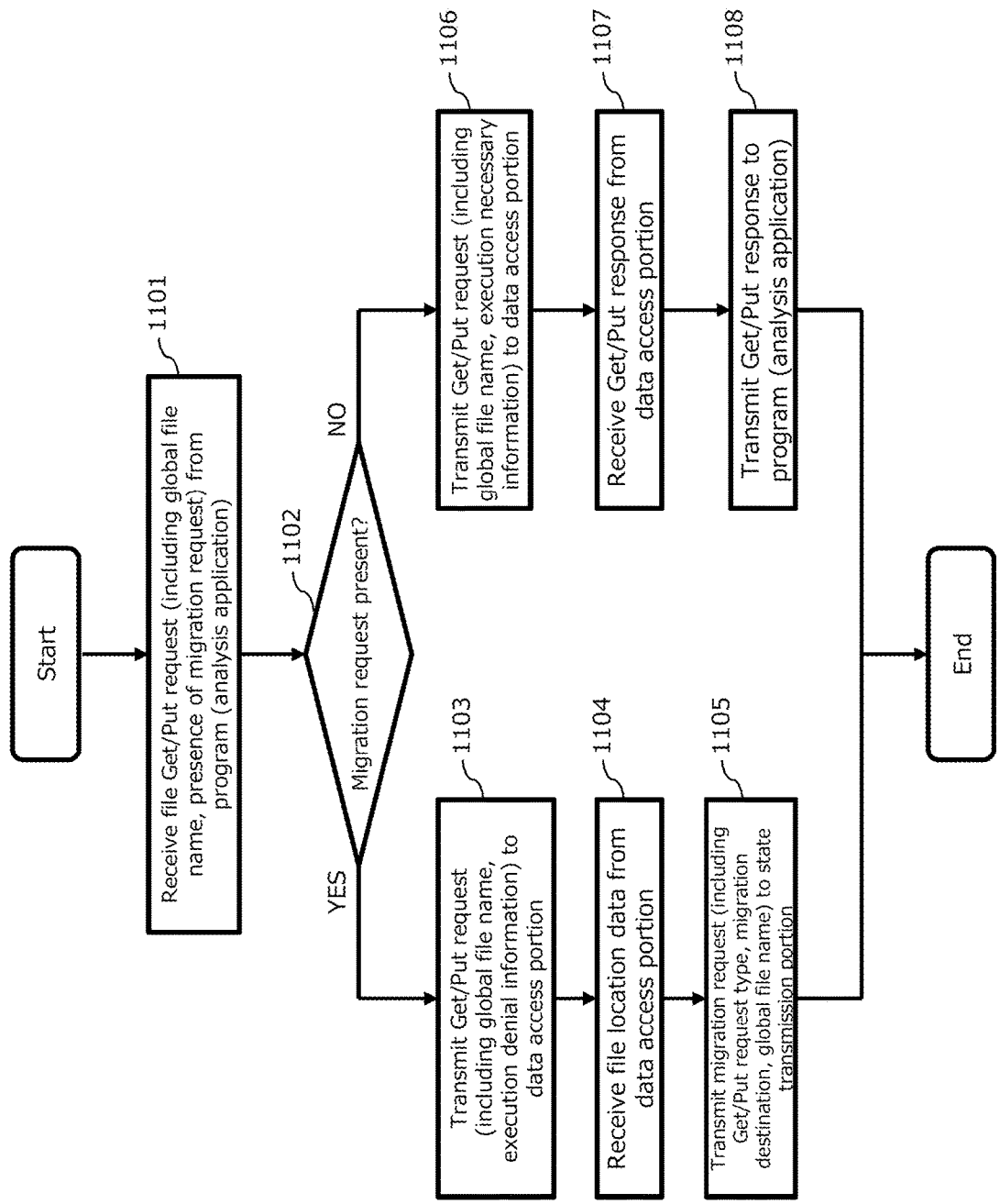
FIG. 11 is a flowchart illustrating file Get request processing and file Put request processing of the event management portion according to the embodiment.

FIG. 11 is a flowchart illustrating file Get request processing and file Put request processing of the event management portion according to the embodiment.

In FIG. 11, the event management portion 123 receives the file Get request or the file Put request from the analysis application 121 (Step 1101). The file Get request or the file Put request includes the global file name 301 for identifying the analysis target files 136 and 137 which are targets of Get or Put. Moreover, information indicating presence of a migration request indicating whether the program which issued the file Get request or the file Put request should be migrated to the program execution bases 111 and 112 belonging to the identical base to the analysis target files 136 and 137 before the Get or Put operation is also included.

Subsequently, the event management portion 123 determines presence of a migration request of the program which issued the file Get request or the file Put request (Step 1102). If there is a migration request, the event management portion 123 issues the Get request or the Put request to the data access portion 125 (Step 1103). This Get request or the Put request includes the global file name 301 received from the analysis application 121 at Step 1101. Moreover, the information indicating execution unnecessity of the Get operation or the Put operation is also included.

Subsequently, the event management portion 123 acquires the file location data 135 including the file server IP address 302 and the local file name 303 from the data access portion 125 (Step 1104).

Subsequently, the event management portion 123 issues a migration request to the state transmission portion 127 (Step 1105). This migration request includes the migration destination information determined on the basis of the file server IP address 302 acquired at Step 1104 and moreover, the global file name 301 received at Step 1101 in addition to the Get/Put request type. After the issuance of this migration request, the processing is ended.

On the other hand, if there is no migration request at Step 1102, the event management portion 123 issues the Get Request or the Put request to the data access portion 125 (Step 1106). This Get request or the Put request includes information indicating execution necessity of the Get operation or the Put operation in addition to the global file name 301 received at Step 1101.

Subsequently, the event management portion 123 receives a Get response or a Put response from the data access portion 125 (Step 1107).

Subsequently, the event management portion 123 transmits the Get response or the Put response received at Step 1107 to the analysis application 121 (Step 1108) and ends the processing.

Figure 12:
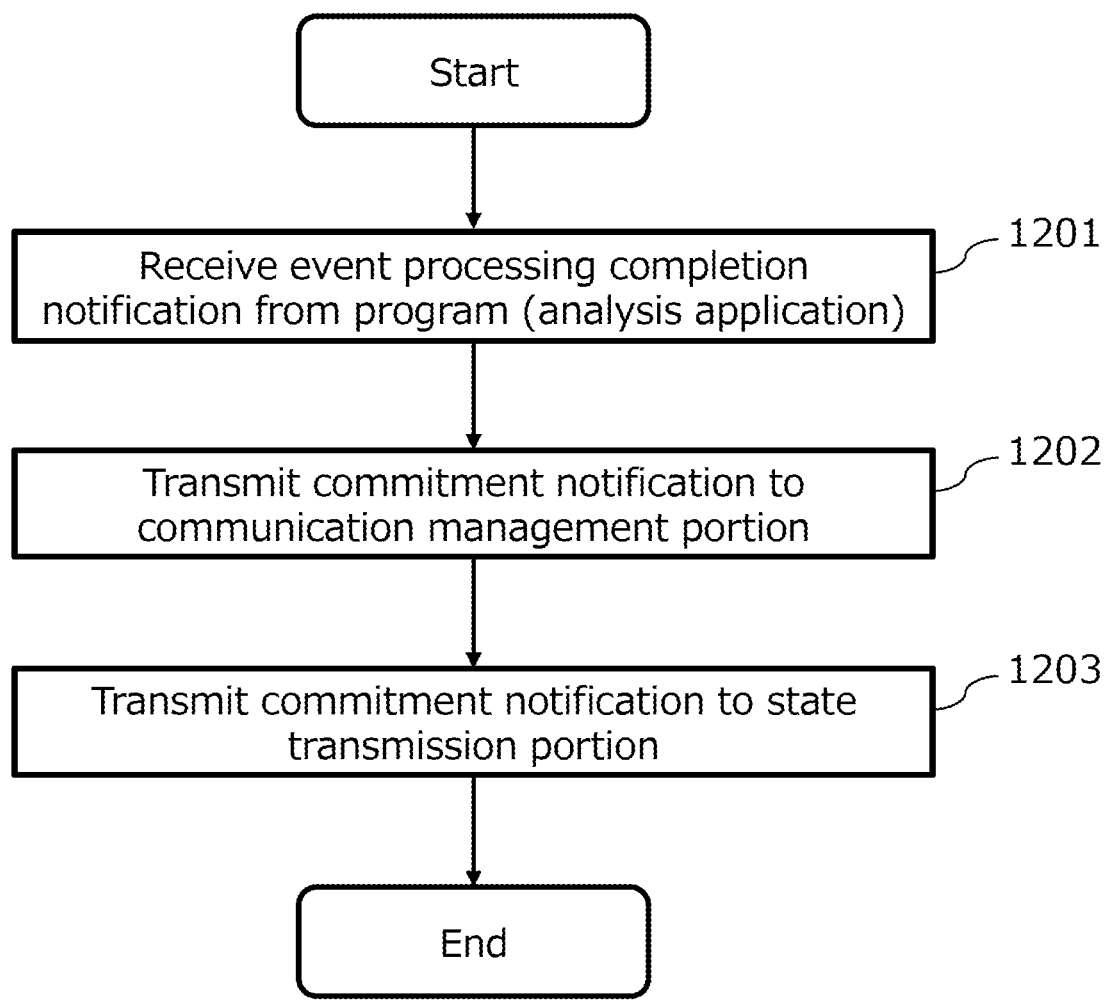
FIG. 12 is a flowchart illustrating event processing completion request processing of the event management portion according to the embodiment.

FIG. 12 is a flowchart illustrating event processing completion request processing of the event management portion according to the embodiment.

In FIG. 12, the event management portion 123 receives event processing completion notification from the analysis application 121 (Step 1201).

Subsequently, the event management portion 123 transmits a commitment notification to the communication management portion 122 (Step 1202). This commitment can indicate confirmation of completion of the event processing of the analysis application 121. When the communication management portion 122 receives the commitment notification, it can initialize the communication management work area 134.

Subsequently, the event management portion 123 transmits the commitment notification to the state transmission portion 127 (Step 1203) and ends the processing.

Figure 13:
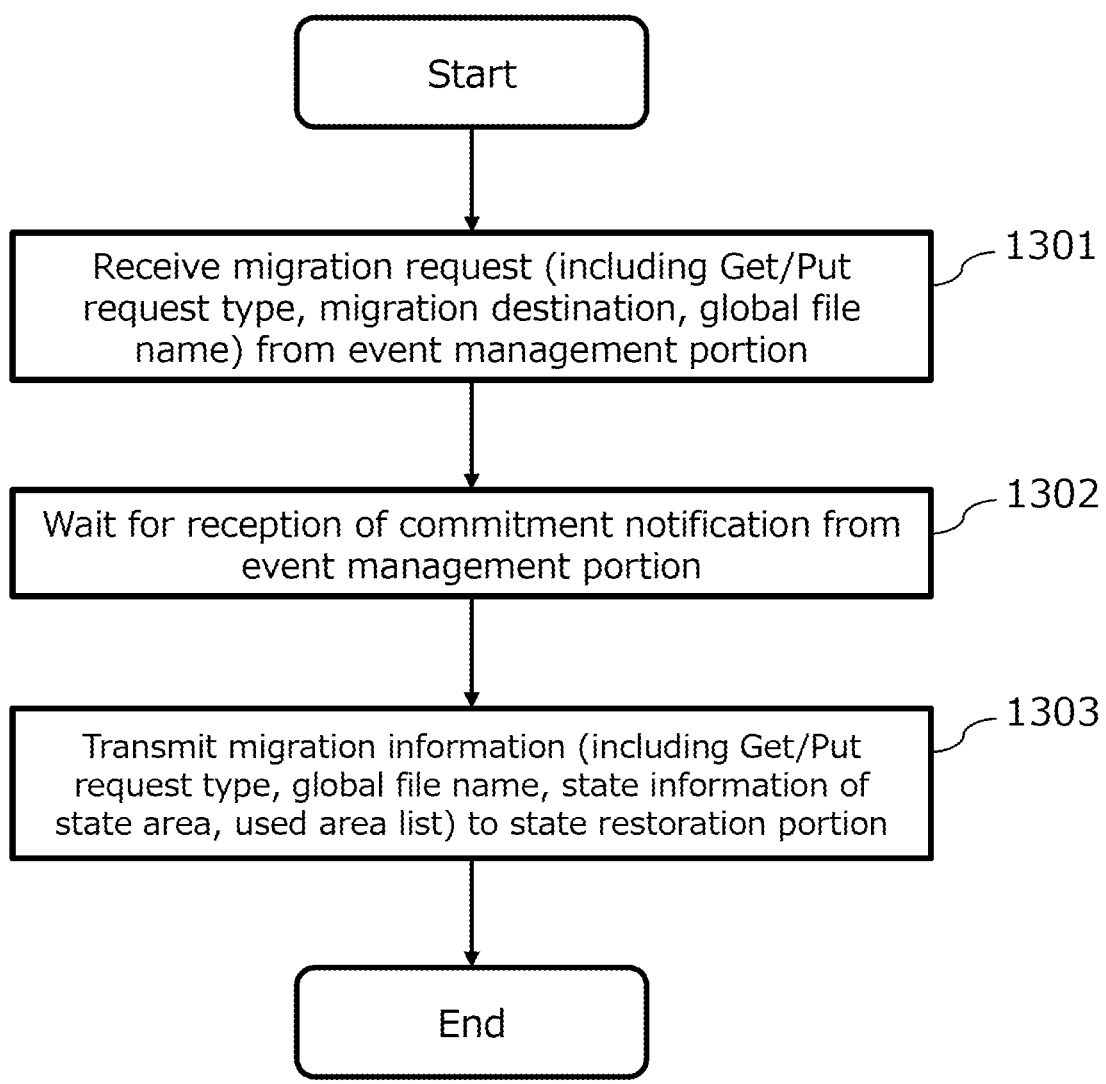
FIG. 13 is a flowchart illustrating processing of a state transmission portion according to the embodiment.

FIG. 13 is a flowchart illustrating processing of the state transmission portion according to the embodiment.

In FIG. 13, the state transmission portion 127 starts an operation by using reception of the migration request from the event management portion 123 as a trigger (Step 1301). This migration request includes a Get/Put request type, migration destination information, and the global file name 301.

Subsequently, the state transmission portion 127 waits for reception of the commitment notification from the event management portions 123 and 124 (Step 1302).

Subsequently, the state transmission portion 127 executes I/O processing with respect to the data information restoration portion 128 and transfers the migration information required for execution of the migration. The migration information transferred at this Step includes the Get/Put request type received at Step 1301, the global file name 301, state information of the application state area 131 and the communication management state area 133 stored in the main memory 113, and the used area list 602. By referring to the used area list 602, locations of the application state area 131 and the communication management state area 133 on the main memory 113 can be acquired (Step 1303). After this migration information is transferred, the processing is ended.

Here, when the state transmission portion 127 transfers the migration information to the data information restoration portion 128, the work information of the application work area 132 and the communication management work area 134 are not transferred. By doing this, an increase in a load applied to the network transfer can be suppressed and delay accompanying the migration of the program can be reduced.

Moreover, after waiting for the reception of the commitment notification from the event management portions 123 and 124, the state transmission portion 127 transfers the migration information to the data information restoration portion 128, whereby at execution at the distributed base 102 of the program migrated from the center base 101, the work information of the application work area 132 and the communication management work area 134 on the center base 101 can be made unnecessary.

Furthermore, the state transmission portion 127 transfers the state information of the communication management state area 133 together with the state information of the application state area 131 to the data information restoration portion 128, so that it can be applied to an application for executing computing processing while the OS function such as network communication is used.

Figure 14:
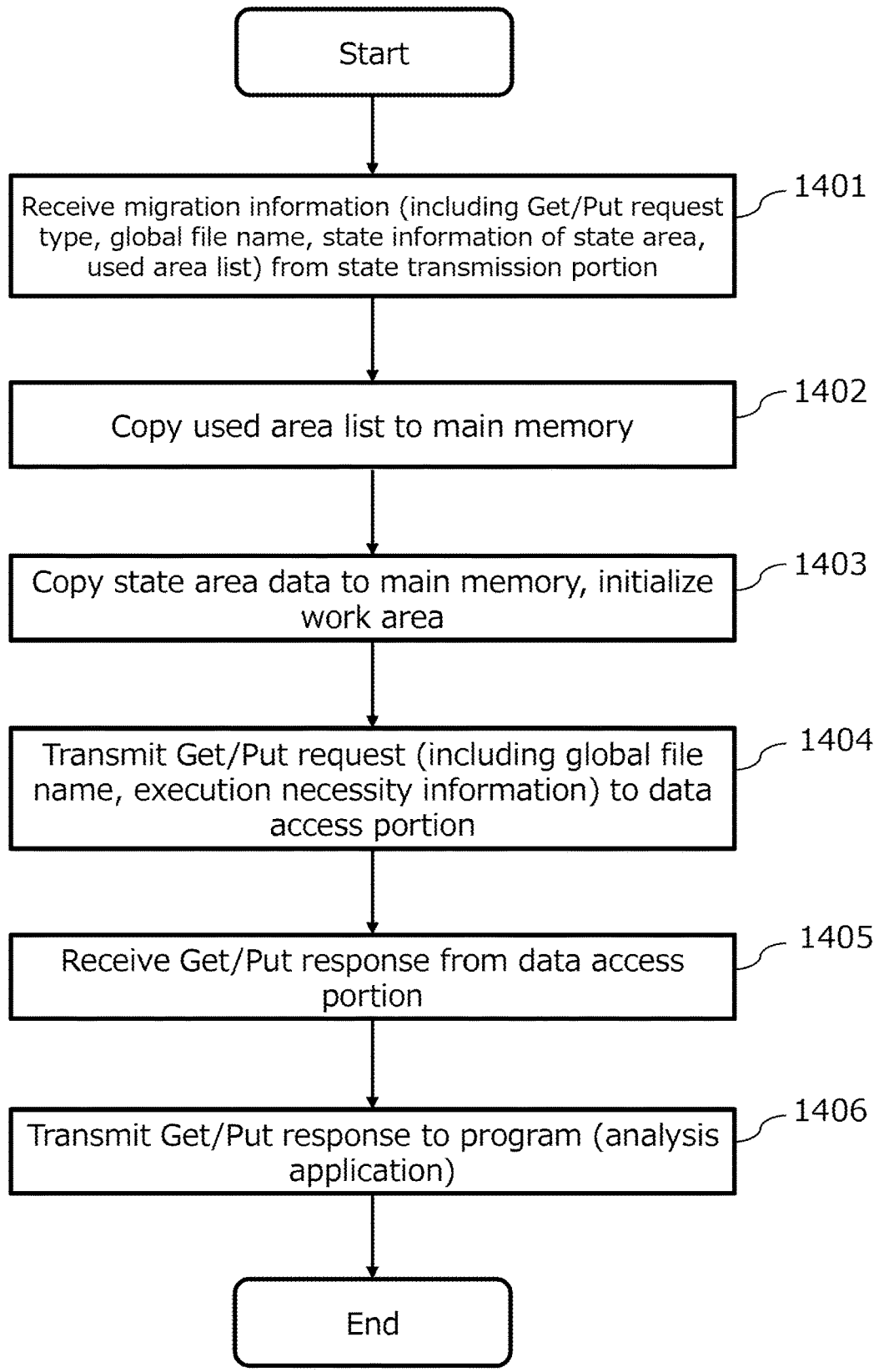
FIG. 14 is a flowchart illustrating processing of a state restoration portion according to the embodiment.

FIG. 14 is a flowchart illustrating processing of the state restoration portion according to the embodiment.

In FIG. 14, the state restoration portion 128 starts an operation by using reception of the migration information from the state transmission portion 127 as a trigger (Step 1401). The migration information includes the Get/Put request type, the global file name 301, the state information of the application state area 131 and the communication management state area 133 stored in the main memory 113, and the used area list 602.

Subsequently, the state restoration portion 128 copies the used area list 602 received at Step 1401 to the main memory 114 (Step 1402).

Subsequently, the state restoration portion 128 copies the state information of the application state area 131 and the communication management state area 133 received at step 1401 to the main memory 114. Moreover, it calculates addresses of the application work area 132' and the communication management work area 134' in the main memory 114 from the information of the used area list 602 received at Step 1401 and initializes the application work area 132' and the communication management work area 134' (Step 1403).

Subsequently, the state restoration portion 128 issues the Get request or the Put request to the data access portions 125 and 126 in accordance with the Get/Put request type received at Step 1401 (Step 1404). This Get request or the Put request includes the global file name 301 received at Step 1401. Moreover, the information indicating execution necessity of the Get processing or the Put processing to the analysis target files 136 and 137.

Subsequently, the state restoration portion 128 waits for the reception of the Get response or the Put response from the data access portions 125 and 126 (Step 1405).

Subsequently, the state restoration portion 128 notifies the Get response or the Put response received at Step 1404 to the analysis application 121' (Step 1406) and ends the processing.

Figure 15:
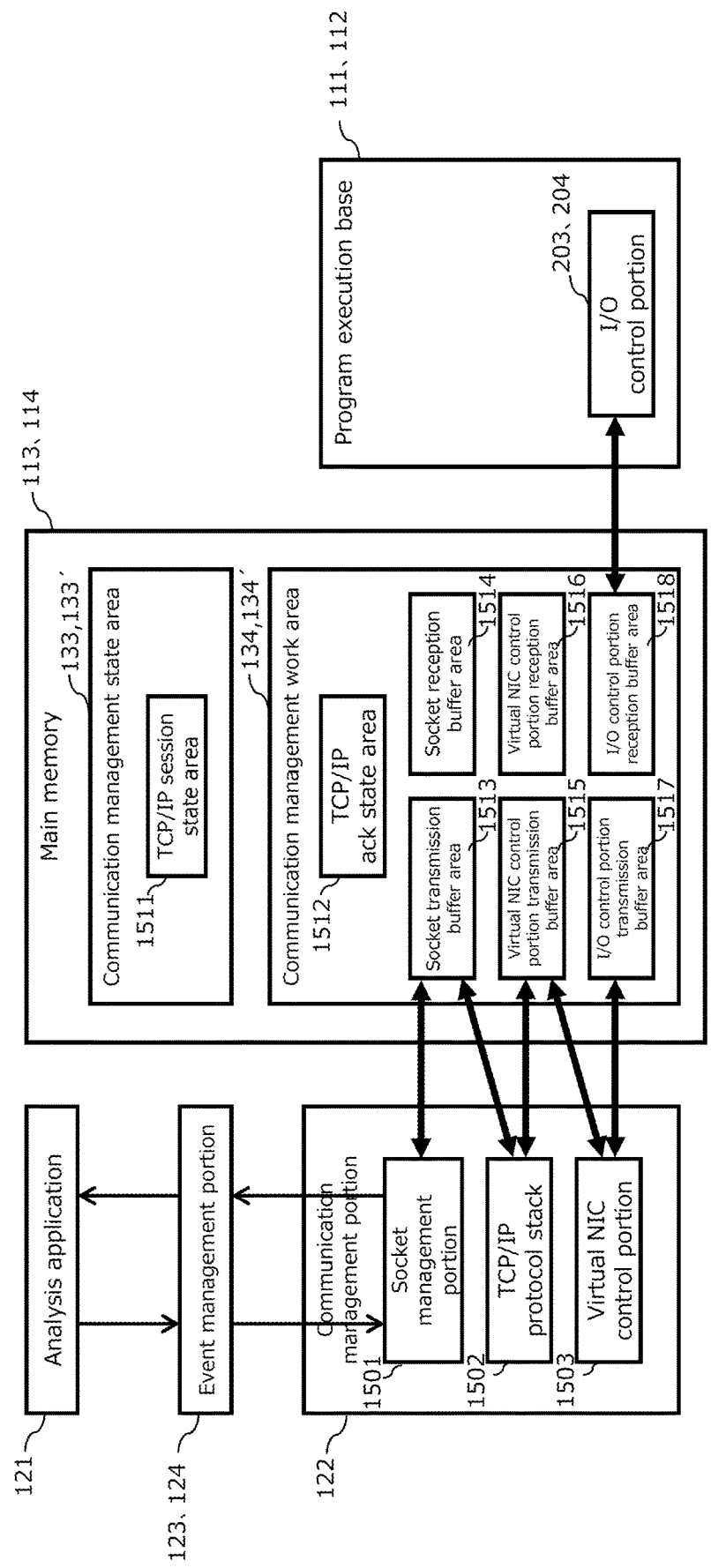
FIG. 15 is a block diagram illustrating configuration of a communication management portion according to the embodiment.

FIG. 15 is a block diagram illustrating configuration of the communication management portion according to the embodiment.

In FIG. 15, a socket management portion 1501, a TCP/IP protocol stack 1502, and a virtual NIC (Network Interface Card) control portion 1503 are provided in the communication management portion 122.

The socket management portion 1501 receives a data transmission request event or a data reception request event from the analysis application 121 through the event management portion 123 and performs issuance of the transmission request to the TCP/IP protocol stack 1502 or notification of the data received by the TCP/IP protocol stack 1502 to the analysis application 121.

The TCP/IP protocol stack 1502 executes transmission/reception processing of the data in accordance with the TCP/IP protocol. In order to hold state information required for this transmission/reception processing, a TCP/IP session state area 1511 is reserved in the communication management state areas 133 and 133', and a TCP/IP ack state area 1512 is reserved in the communication management work areas 134 and 134'.

The virtual NIC control portion 1503 conducts data transmission/reception with the program execution bases 111 and 112 of the program executing apparatus at a remote base via the communication network by transmitting/receiving the data to/from the I/O control portions 203 and 204 of the program execution bases 111 and 112.

Since data transmission/reception is conducted among the socket management portion 1501, the TCP/IP protocol stack 1502, the virtual NIC control portion 1503, and the I/O control portions 203 and 204, a socket transmission buffer area 1513, a socket reception buffer area 1514, a virtual NIC control portion transmission buffer area 1515, a virtual NIC control portion reception buffer area 1516, an I/O control portion transmission buffer area 1517, an I/O control portion reception buffer area 1518 are reserved in the communication management work areas 134 and 134'.

Here, by reserving the TCP/IP ack state area 1512, the socket transmission buffer area 1513, the socket reception buffer area 1514, the virtual NIC control portion transmission buffer area 1515, the virtual NIC control portion reception buffer area 1516, the I/O control portion transmission buffer area 1517, the I/O control portion reception buffer area 1518 in the communication management work areas 134 and 134', the data stored in these areas can be deleted after reception of the commitment notification, and a data amount to be transferred in migration of the communication management portion 122 can be reduced.

Moreover, by reserving only the TCP/IP session state area 1511 in the communication management state areas 133 and 133' and by holding the TCP/IP session state area 1511 in the communication management state areas 133 and 133' in the migration of the program, the communication can be established between the center base 101 and the distributed base 102.

FIG. 16 is a view illustrating a data structure of TCP/IP session state information according to the embodiment.

In FIG. 16, the TCP/IP session state information stored in the TCP/IP session state area 1511 has a table structure in which entries are present for each socket. In each entry, in addition to a socket ID 1601, a local IP address 1602 storing connection information of the socket, a local port number 1603, a remote IP address 1604, and a remote port number 1605, there are a transmission sequence number 1606 storing a sequence number given to a TCP/IP packet and a field storing a reception sequence number 1607.

If a migration destination of the program in the center base 101 is the distributed base 102, the local IP address 1602 and the local port number 1603 are allocated to the center base 101, and the remote IP address 1604 and the remote port number 1605 can be allocated to the distributed base 102. Communication of migration can be conducted between the center base 101 and the distributed base 102 by using the local IP address 1602, the local port number 1603, the remote IP address 1604, and the remote port number 1605.

The transmission sequence number 1606 and the reception sequence number 1607 can be used for re-transmission in the case of a failure of data communication or in the case of missing data.

FIG. 17 is a view illustrating a data structure of TCP/IP ack state information according to the embodiment.

In FIG. 17, the TCP/IP ack state information stored in the TCP/IP ack state area 1512 has a table structure in which there are entries for each socket. In each entry, there is a field storing an ack completed number 1702 in addition to a socket ID 1701. The ack completed number 1702 manages a sequence number of ack received with respect to the transmission data.

Figure 18:
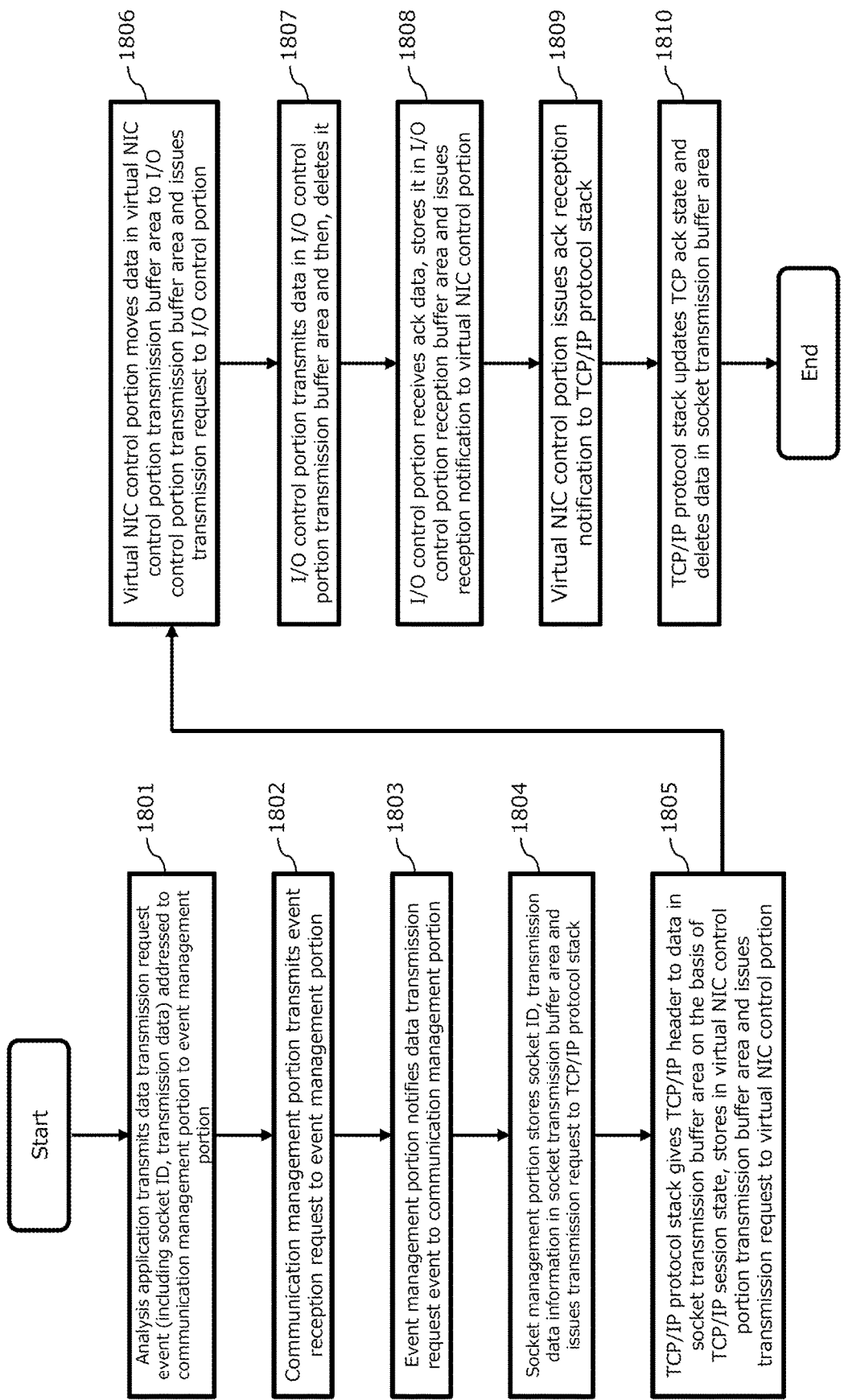
FIG. 18 is a flowchart illustrating processing of the communication management portion at reception of a data transmission request event according to the embodiment.

FIG. 18 is a flowchart illustrating processing of the communication management portion at reception of the data transmission request event according to the embodiment.

In FIG. 18, the event management portions 123 and 124 receive an event transmission request of the data transmission request event addressed to the communication management portion from the analysis application 121 (Step 1801). In this event, information for identifying the data transmission request event as the event type 812 is present, and information designating the socket ID 1601 or the transmission data as the event information 813 is present.

Subsequently, the communication management portion 122 transmits the event reception request to the event management portions 123 and 124 (Step 1802). This event reception request is reservation for receiving the ack from the event management portions 123 and 124. This event reception request may be executed after Step 1806 or may be executed after Step 1807.

Subsequently, the socket management portion 1501 receives the data transmission request event transmitted at Step 1801 from the event management portions 123 and 124 (Step 1803). At this time, information designating the socket ID 1601 or the transmission data transmitted together at Step 1801 as the event information 813 is also received.

Subsequently, the socket management portion 1501 stores the socket ID 1601 and the transmission data received at Step 1803 in the socket transmission buffer area 1513 and issues a transmission request to the TCP/IP protocol stack 1502 (Step 1804).

Subsequently, the TCP/IP protocol stack 1502 executes transmission processing of the transmission data stored in the socket transmission buffer area 1513 (Step 1805). At this time, the entry of the TCP/IP session state information matching the socket ID 1601 stored in the socket transmission buffer area 1513 is searched, and the local IP address 1602, the local port number 1603, the remote IP address 1604, the remote port number 1605, and the transmission sequence number 1606 corresponding to the entry are given to the transmission data as a TCP/IP header. Then, the transmission data is stored in the virtual NIC control portion transmission buffer area 1515. Moreover, the transmission sequence number 1606 of the entry is updated, and control is made so that a continuous transmission sequence number is given to the subsequent transmission data. Furthermore, a transmission request is issued to the virtual NIC control portion 1503.

Subsequently, the virtual NIC control portion 1503 migrates the data stored in the virtual NIC control portion transmission buffer area 1515 to the I/O control portion transmission buffer area 1517. Then, a transmission request is issued to the I/O control portions 203 and 204 (Step 1806).

Subsequently, the I/O control portions 203 and 204 transmit the data in the I/O control portion transmission buffer area 1517 to the program execution bases 111 and 112 designated by the remote IP address 1604. Moreover, the data in the I/O control portion transmission buffer area 1517 is deleted (Step 1807).

Subsequently, the I/O control portions 203 and 204 receive the ack data from the remote program execution bases 111 and 112. Then, an ack data reception notification is issued to the virtual NIC control portion 1503 (Step 1808).

Subsequently, the virtual NIC control portion 1503 issues an ack data reception notification to the TCP/IP protocol stack 1502 (Step 1809).

Subsequently, the TCP/IP protocol stack 1502 updates the ack completed number of the entry corresponding to the TCP ack state information to a value of the transmission sequence number 1606 of the entry corresponding to the TCP/IP session state information. Then, the transmission data stored in the socket transmission buffer area 1513 is deleted (Step 1810).

FIG. 19 is a flowchart illustrating processing of the communication management portion in reception of the data reception request event according to the embodiment.

In FIG. 19, the I/O control portions 203 and 204 receive data from the remote program execution bases 111 and 112 and stores the received data in the I/O control portion reception buffer area 1518. Then, a reception notification is issued to the virtual NIC control portion 1503 (Step 1901).

Subsequently, the virtual NIC control portion 1503 migrates the data in the I/O control portion reception buffer area 1518 to the virtual NIC control portion reception buffer area 1516 and issues a reception notification to the TCP/IP protocol stack 1502 (Step 1902).

Subsequently, the TCP/IP protocol stack 1502 migrates the data in the virtual NIC control portion reception buffer area 1516 to the socket reception buffer area 1514. Then, a reception notification is issued to the socket management portion 1501. Moreover, the entry of the TCP/IP session state information corresponding to the local IP address 1602, the local port number 1603, the remote IP address 1604, and the remote port number 1605 given to the data stored in the virtual NIC control portion reception buffer area 1516 is searched, and values of the socket ID 1601 and the socket reception sequence number 1607 corresponding to the entry are acquired. The value of the socket ID 1601 is stored in the socket reception buffer area 1514 together with the received data. Moreover, matching of the reception sequence number 1607 with the transmission sequence number 1606 given to the data stored in the virtual NIC control portion reception buffer area 1516 is inspected, and arrival of the data from the remote program execution bases 111 and 112 without missing or a wrong order is confirmed. Then, the ack data transmission request is issued to the I/O control portions 203 and 204 through the virtual NIC control portion 1503, and the ack data is transmitted to the remote program execution bases 111 and 112 (Step 1903). After this transmission, the reception sequence number 1607 of the TCP/IP session state information is updated, and control is executed so that the ack data transmission to the subsequent received data can be correctly conducted.

Subsequently, the event management portions 123 and 124 receive the data reception request event addressed to the communication management portion from the analysis application 121 (Step 1904). In this event, information for identifying the data transmission request event as the event type 812 is present, and information designating the socket ID 1601 or the reception buffer address as the event information 813 is present.

Subsequently, the communication management portion 122 transmits an event reception request to the event management portions 123 and 124 (Step 1905).

Subsequently, the socket management portion 1501 receives the data reception request event transmitted at Step 1801 from the event management portions 123 and 124 (Step 1906). At this time, information designating the socket ID 1601 or the reception buffer address transmitted together at Step 1904 are also received as the event information 813.

Subsequently, the socket management portion 1501 migrates the data in the socket reception buffer area 1514 corresponding to the socket ID 1601 received at Step 1906 to the area designated by the reception buffer address received at Step 1906, deletes the data stored in the socket reception buffer area 1514 (Step 1907) and completes the processing.

FIG. 20 is a flowchart illustrating processing of the communication management portion at reception of a commitment notification according to the embodiment.

In FIG. 20, the socket management portion 1501 receives the commitment notification from the event management portions 123 and 124 (Step 2001).

Subsequently, the socket management portion 1501 waits until the data in the socket transmission buffer area 1513 becomes null (Step 2002). At this time, it can wait until the data transmission request event processing from the analysis application 121 being executed illustrated from Step 1801 to Step 1811 is completely finished.

Subsequently, the socket management portion 1501 waits until the data in the socket reception buffer area 1514 becomes null (Step 2003). At this time, it can wait until the data reception request event processing from the analysis application 121 being executed illustrated from Step 1901 to Step 1908 is completely finished. When this waiting is completed, processing at reception of the commitment notification is completed. And the program can be migrated after completion of this waiting.

The embodiments are described above in detail only to make the present invention more clearly understandable, and thus not all the described configurations need to be used. A configuration of one embodiment can be partially replaced with a configuration of another embodiment. Furthermore, a configuration of one embodiment can be added to a configuration of another embodiment. A configuration of each embodiment can be additionally provided with a different configuration, deleted, or replaced.

What is claimed is:

1. A program executing apparatus comprising:
a memory; and
a processor communicatively coupled to the memory, wherein the processor is configured to
configure migration timing of a program on the basis of a state of the program being executed at reception of a migration request from the program,
migrate state information of the program on the basis of the migration timing configured in the processor,
reserve a state area and a work area used for execution of the program in the memory,
cause migration of the program to stand by until completion of event processing currently being executed by the program, and
migrate the state information held in the state area on the basis of a completion notification of the event processing.

2. The program executing apparatus according to claim 1, wherein
after completion of the event processing currently being executed by the program, the work area is initialized, and the processor does not migrate work information held in the work area.

3. The program executing apparatus according to claim 1, wherein the processor is further configured to
execute data transmission processing on the basis of a data transmission request from the program;
execute data reception processing on the basis of a data reception request from the program;
manage the data transmission processing and the data reception processing;
disposes a session information storage area in the state area, the session information storage area being referred to in the processor;
disposes a buffer area in the work area, the buffer area being referred to or updated in the processor; and
cause migration of the program to stand by until the buffer area becomes free on the basis of a completion notification of the event processing.

4. The program executing apparatus according to claim 3, wherein
the processor is further configured to:
provide each of a plurality of applications and conduct data transmission/reception with a program execution base at a migration destination of the program.

5. The program executing apparatus according to claim 1, wherein
the program includes an application and an operating system;
the processor reserves an application state area and an application work area used for execution of the application in the memory and also reserves a communication management state area and a communication management work area used for execution of the operating system in the memory; and
the processor migrates application state information held in the application state area, communication management state information held in the communication management state area, address information of the application state area, and address information of the communication management state area on the basis of a completion notification of the event processing.

6. The program executing apparatus according to claim 5, wherein
a TCP/IP session state is stored in the communication management state area;
a buffer area is reserved in the communication management work area; and the operating system initializes the buffer area after reception of a commitment notification indicating completion of event processing of the application.

7. The program executing apparatus according to claim 5, wherein
the application designates a migration destination of the program state information.

8. The program executing apparatus according to claim 1, wherein the processor is further configured to:
detect an IP address of a file server holding data executed in the program on the basis of a request from the program; and
migrate state information of the program to a migration destination determined on the basis of the IP address.

9. The program executing apparatus according to claim 8, wherein
the processor detects the IP address on the basis of a file Get request or a file Put request from the program.

10. The program executing apparatus according to claim 1, wherein the processor is further configured to:
restore a state of the program on the basis of state information of the program migrated from the processor portion and to take over execution of the program.

11. A program execution method that migrates a program between a first base in which a first program execution base is provided and a second base in which a second program execution base is provided and executes the program, the method comprising:
configuring migration timing of the program from the first base to the second base on the basis of a state of the program being executed at reception of a migration request from the program of the first base; and
migrating state information of the program from the first base to the second base on the basis of the migration timing of the program, wherein
a state area and a work area used for execution of the program are reserved in a memory of the first base;
migration of the program is made to wait until completion of event processing currently being executed by the program; and
state information held in the state area is migrated from the first base to the second base on the basis of a completion notification of the event processing.

12. The program execution method according to claim 11, wherein
data transmission processing is executed on the basis of a data transmission request from the program;
data reception processing is executed on the basis of a data reception request from the program;
a session information storage area referred to in the data transmission processing and the data reception processing is disposed in the state area;
a buffer area referred to or updated in the data transmission processing and the data reception processing is disposed in the work area; and
migration of the program is made to wait until the buffer area becomes free on the basis of a completion notification of the event processing.

13. The program execution method according to claim 11, wherein
an IP address of a file server of the second base holding data executed in a program is detected on the basis of a request from the program of the first base; and
state information of the program is migrated to the second base determined on the basis of the IP address.

* * * * *